United States Patent Office 3,170,216
Patented Feb. 23, 1965

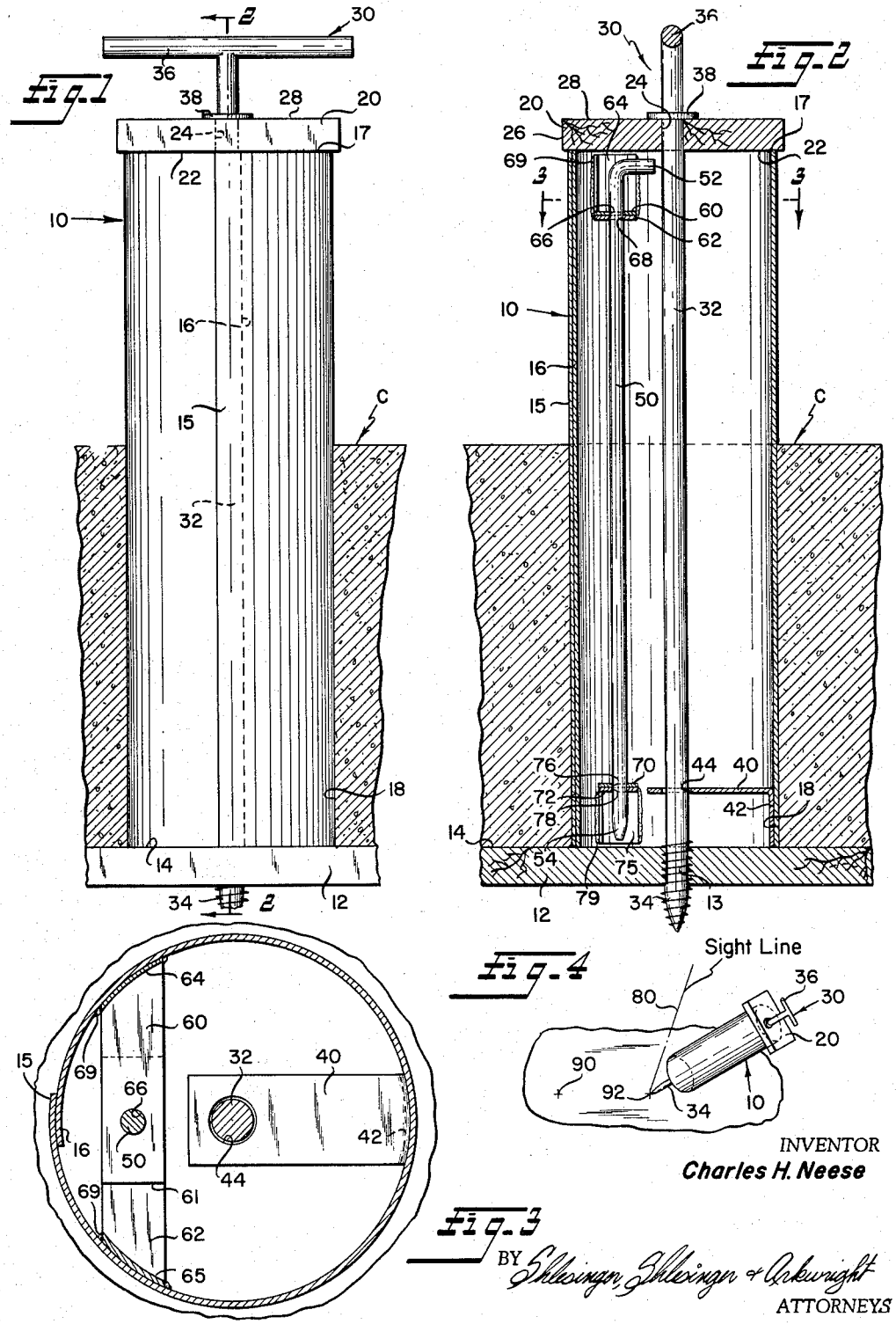

3,170,216
APERTURE FORMING MOLD FOR MOLDED STRUCTURES
Charles H. Neese, 7801 Layton Drive, Springfield, Va.
Filed Nov. 13, 1963, Ser. No. 323,461
2 Claims. (Cl. 25—128)

This invention relates to the making of openings in molded structures, and relates particularly to a molding assembly which is used for such purposes.

In the making of molded structures, such as the poured concrete floors of buildings and the like, it is often necessary to provide an opening through which electrical conduits, piping and similar lines may be passed. The usual practice in such instances is to use a hollow form, such as a cylindrical member which is fixed to the mold board on which the poured concrete is supported, so that it protrudes above the top of the concrete.

One current practice employed in the building industry is to use removable molding forms, which are emplaced on the mold board prior to pouring of a concrete floor, and then later are removed after the concrete has hardened.

The devices currently used present a problem in that they are not installed as quickly as desired, nor can they be removed without some difficulty. This invention contemplates the solving of both such problems, in that it is readily installed with a minimum of effort, and is quickly removed after the concrete floor has hardened. The molding assembly contemplated is also reusable indefinitely.

Accordingly, it is one of the principal objectives of my invention to provide an assembly which can quickly and readily be installed on a mold board prior to pouring of the molding material.

A further object of this invention is to provide a molding assembly which can accurately be positioned at a desired location with a minimum of effort.

A still further object of this invention is to make it possible to easily remove the molding assembly after the poured molding material has hardened.

A still further object of this invention is to provide a molding assembly which is of durable and simple construction.

Another object of this invention is to provide a molding assembly which is not damaged in use, and is re-usable.

A still further object of this invention is to provide an entirely new and simplified molding assembly which is more easily installed and removed than heretofore.

Another and still further object of this invention is to provide a molding assembly which has a unique locking arrangement for preventing collapse of the molding member prior to setting of the molding material, but which thereafter is quickly unlocked to permit slight collapse of the molding member, so that the molding assembly is easily removed.

These and still further objects and advantages of my invention reside in the details of construction, arrangement, combination of the various parts of my aperture forming mold for molded structures as hereinafter more fully set forth, and as specifically pointed out in my claims, and illustrated in the accompanying drawings, in which:

FIGURE 1 shows an elevational view of the molding assembly in position with the molding material thereanound.

FIGURE 2 shows a cutaway elevational view indicating the inner arrangement of this invention.

FIGURE 3 shows a cross-sectional view of the assembly of FIGURE 2 along the lines 3—3.

FIGURE 4 shows a perspective view of the mold assembly ready for installation.

Referring particularly to the unit assembly as shown in FIGURES 1 and 2, a cylindrically shaped piece of sheet metal generally indicated at 10 and having a longitudinally split side with overlapping edges 15 and 16 forms a hollow cylindrical mold member having top and bottom edges 17 and 18 respectively.

The hollow mold member 10 is mounted in upright position on a mold-board 12, with the bottom edge 18 thereof mounted on the upper surface 14 of mold member 12.

Cement or other similar type of molding material generally indicated at C is poured around the mold member and supported on the mold-board 12, so that after the molding material has set, an opening will be left when the hollow cylindrical mold member 10 is removed.

The hollow cylindrical mold member 10 has a pressure block 20 which has its lower surface 22 in direct contact with the upper edge 17 of the hollow mold member 10. An opening 24 through the block 20 permits support rod 30 to pass therethrough. The block 20, as indicated at 26, overhangs the outer circumference of the hollow molding member 10.

The support rod 30 has a central shank 32 which extends through the body member and down through the opening 44 in support bracket 40, the latter having a flange 42 which is fixed to the inner wall of the hollow body member 10. The lower end 34 of the support rod unit 30 has a threaded section 34 which is fitted into and engages the periphery of opening 13 in the mold-board 12.

A handle 36 provides the means for an operator to turn the support rod 30 to screw the threaded section 34 down through the opening 13. When the rod is screwed down to its final position, the stop washer 38 will engage the upper surface 28 of the pressure block 20, so that the support rod, through the pressure block 20 exerts a force on the upper edge 17 of the body member to thereby force the lower edge 18 into rigid tight engagement with the upper surface 14 of the pressure board.

The connecting member 40 holds the support rod 30 in proper alignment with respect to the hollow mold member 10. The shank 32 of rod 30 passes through the opening 44 in the connecting member 40, the connecting member being disposed in a generally horizontal or transverse position. The connecting member has a flange 42 which is fixed to the inner wall of the hollow mold member 10.

The hollow mold member 10 is made collapsible to some degree by having the two edge sections 15 and 16 slidably with respect to each other under normal conditions. A locking arrangement employing two pair of bracket members and a pin connection is used to prevent relative movement of the edge sections 15 and 16 during molding. This arrangement is an extremely simple and effective way of locking the overlapping edges 15 and 16 in desired position for molding and also permits use of a simple release so that the hollow mold member may be slightly collapsed to free it from the hardened molded structure after setting.

The upper pair of fastening bracket members include transversely extending plates 60 and 62, a shown in FIGURES 2 and 3. The upper bracket plate 60 has a perpendicularly disposed support piece 64 which is attached to the end wall of the hollow mold member 10 at a position substantially displaced from the inner edge 16 as shown in FIGURE 3. Member 60 extends directly across and behind the overlapping edges and has an opening 66 through which the locking rod 50 is passed. Bracket plate 62 is similar to bracket plate 60, being a flat plate with an opening 68. It is attached to the inner surface of mold member 10 at a position substantially spaced from the edge 15 and extends across behind the overlapping edges 15 and 16 to underlie plate bracket 62. The opening 68 is positioned so that when openings 66 and 68 are in line the side edges 15 and 16 will be held in locked overlapping position ready for pouring of the molding material. The upper pair of bracket members 60 and 62 are positioned near the upper edge 17 of the hollow mold member 10.

A lower pair of fastening bracket members 70 and 72 of similar construction to the upper pair of bracket members are located adjacent the lower edge 18 of the mold member and directly below the upper pair of bracket members. Plate bracket members 70 and 72 have openings 76 and 78 arranged to coincide when the lower position of the edges 15 and 16 are in correct overlapping position for pouring of the mold material. Plate bracket 72 is fixed to the inner wall of the mold member 10 by a depending flange 75 which is welded as indicated at 79 to the wall at a point displaced from the inner edge 16. The plate bracket 72 extends across and behind the overlapping edges 15 and 16 and is positioned under the plate bracket 70 which is fixed to the inner wall of the hollow mold member 10 at a point displaced from the edge 15.

The locking of the edges 15 and 16 in correct position is accomplished merely by inserting the rod 50 with its tapered end 54 through the upper openings 66 and 68 of plate brackets 60 and 62 and then down and through the lower openings 76 and 78 of plate brackets 70 and 72. The locking arrangement makes a rigid cylindrical mold which will not collapse under pressure of the molding material.

When the rod is to be removed, the handle portion 52 is grasped and the rod withdrawn from the upper and lower brackets.

In operation the mold board 12 is first drilled with a plurality of holes such as shown at 90 and 92 in FIGURE 4, these holes corresponding to the hole 13 shown in FIGURE 2.

The operator first aligns the locking bracket openings by expanding the hollow mold member slightly, and then inserts the rod 50 through the aligned openings 64 and 68 of the upper pair of plate brackets and the openings 76 and 78 of the lower pair of plate brackets so that the hollow mold member is reinforced by a rigid connection immediately behind the free and overlapping side edges 15 and 16.

The operator then places the shank 32 of the support rod 30 through the opening 24 of the pressure block, and then inserts the lower portions 34 of the support rod 30 through the opening 44 of the bracket 40. The aperture mold assembly is now ready for installation, and the operator as shown in FIGURE 4 takes a sight along sight line 80 so that the tapered engaging section 34 of support rod 30 is inserted in the hole 92. The entire assembly is then moved to an upright position with the support rod generally disposed perpendicular to the surface 14 of the mold board 12. The handle 36 is then rotated by the operator so that the screw threaded engaging section 34 bites down into the hole 92 and effects a locked self-supporting arrangement as indicated in FIGURES 1 and 2 wherein the support rod 30 pulls the pressure block 26 into firm engagement with the mold member and lower edge 18 of mold member 10 is pressed into firm engagement with the upper surface of the mold board 12.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, I claim:

1. An aperture forming mold assembly for molded structures, comprising, an elongated hollow mold member of sheet material having a closed cross-sectional configuration with open top and bottom ends, said hollow mold member being split longitudinally, with the adjacent side edges overlapping each other, a pressure block with an opening therethrough which has a flat lower surface which lays across and engages the periphery of the open top of said hollow mold member, a support rod of substantially greater length than said hollow mold member which extends through the said opening of said pressure block and longitudinally through the said hollow mold member, said rod having a threaded section which extends below said open bottom end to engage a mold-board, a single plate bracket member integral with the inner surface of said hollow mold member and having an opening through which said support rod extends, said bracket being positioned immediately adjacent said bottom end of mold member, the upper end of said support rod having a handle to facilitate turning thereof, said rod also having a stop means integral therewith located immediately above and in contact with said pressure block, whereby turning of said handle will cause said thread to draw the said rod toward said mold board to press said pressure block against the top of said hollow mold member causing the bottom end thereof to be pressed against said mold board to hold said hollow mold member in firm upright position with respect to said mold board, two pair of fastening brackets within said hollow mold member, one bracket pair adjacent the top end and the other bracket pair adjacent the bottom end of the hollow mold member, a bracket of each of said bracket pairs being immediately adjacent one of said overlapping side edges and spaced a small distance therefrom, the remaining bracket of each of said bracket pairs being similarly positioned with respect to the other of said side edges, to permit the overlapping edges to slide freely with respect to each other without interference from the brackets when said cylinder is slightly collapsed, said brackets being L-shaped pieces one leg of which is attached to the inner surface of said mold member, the other leg extending outwardly from said surface transversely across said hollow mold member and having an opening therein, said openings being aligned with the opening in the corresponding leg of its other paired bracket when said side edges of the hollow mold member are in overlapping contact, the aligned holes in both bracket pairs being in a straight line, a locking rod which extends down through said aligned holes and is shorter than the length of said hollow mold member, said rod connecting the paired brackets to support and fixedly hold the overlapping edges of the hollow mold member together, said rod when removed permitting the overlapping edges to slide with respect to each other to slightly collapse said hollow mold member for easy removal thereof from the hardened molded structure.

2. The aperture forming mold assembly as set forth in claim 1, wherein said brackets are made of sheet material and are welded to said hollow mold member.

References Cited in the file of this patent

UNITED STATES PATENTS

| | | |
|---|---|---|
| 861,106 | Georgenson | July 23, 1907 |
| 867,129 | Hart et al. | Sept. 24, 1907 |
| 1,171,641 | Priest | Feb. 15, 1916 |
| 1,212,021 | Cress | Jan. 9, 1917 |
| 1,746,696 | Dows | Feb. 11, 1930 |